(12) United States Patent
Bobsein et al.

(10) Patent No.: US 7,803,864 B2
(45) Date of Patent: Sep. 28, 2010

(54) ASSOCIATIVE THICKENER COMPOSITIONS AND METHODS OF USE

(75) Inventors: Barrett Richard Bobsein, Sellersville, PA (US); Melissa Merlau Johnson, Ambler, PA (US); Lifeng Zhang, Clifton Park, NY (US)

(73) Assignee: Rohm and Haas Company, Phila., PA (US)

( * ) Notice: Subject to any disclaimer, the term of this patent is extended or adjusted under 35 U.S.C. 154(b) by 679 days.

(21) Appl. No.: 11/638,214

(22) Filed: Dec. 13, 2006

(65) Prior Publication Data

US 2007/0155880 A1 Jul. 5, 2007

Related U.S. Application Data

(60) Provisional application No. 60/756,306, filed on Jan. 5, 2006.

(51) Int. Cl.
C08L 75/04 (2006.01)
C08L 71/02 (2006.01)
C08L 101/14 (2006.01)

(52) U.S. Cl. .................. 524/501; 524/222; 524/227; 524/802

(58) Field of Classification Search .............. 524/501, 524/222, 227, 802
See application file for complete search history.

(56) References Cited

U.S. PATENT DOCUMENTS

| | | | |
|---|---|---|---|
| 3,770,684 A | | 11/1973 | Singer et al. |
| 4,079,028 A | * | 3/1978 | Emmons et al. ............. 524/507 |
| 4,384,096 A | | 5/1983 | Sonnabend |
| 4,496,708 A | | 1/1985 | Dehm et al. |
| 4,499,233 A | | 2/1985 | Tetenbaum et al. |
| 4,735,981 A | * | 4/1988 | Rich et al. .................. 524/247 |
| 5,023,309 A | | 6/1991 | Kruse et al. |
| 5,574,127 A | * | 11/1996 | Sau ............................. 528/125 |
| 5,629,373 A | | 5/1997 | Glancy et al. |
| 5,728,895 A | | 3/1998 | Wiggins et al. |
| 5,736,125 A | * | 4/1998 | Morawsky et al. ............ 424/59 |
| 5,877,245 A | | 3/1999 | Wiggins et al. |
| 5,973,063 A | | 10/1999 | Doolan et al. |
| 6,002,049 A | | 12/1999 | Wiggins et al. |
| 6,107,394 A | * | 8/2000 | Broadbent et al. .......... 524/590 |
| 6,337,366 B1 | | 1/2002 | Amick et al. |
| 6,870,024 B2 | | 3/2005 | Haubennestel et al. |
| 2004/0147672 A1 | | 7/2004 | Ruhlmann et al. |
| 2006/0106153 A1 | | 5/2006 | Blankenship et al. |

FOREIGN PATENT DOCUMENTS

| | | |
|---|---|---|
| DE | 10 2004 061242 | 8/2005 |
| EP | 1358430 | 7/1974 |
| EP | 0 979 850 A1 | 2/2000 |
| EP | 979850 A1 * | 2/2000 |
| EP | 997502 | 5/2000 |
| EP | 997502 A1 * | 5/2000 |
| EP | 1125643 A2 | 8/2001 |
| WO | WO01/12712 | 2/2001 |
| WO | WO2004/078858 | 9/2004 |
| WO | WO2005/068564 | 7/2005 |

OTHER PUBLICATIONS

Glass, J.E.(Ed), *Associative Polymers in Aqueous Solutions*, ACS Symposium Series 765, ACS (2000).
Rohm and Haas Company—Material Safety Data Sheet—Acrysol(TM) RM-870 Thickener.
Nae, H., *Practical Guide to Associative Thickeners: Structure, Thickening Mechanisms and Their Effect on Coatings Properties*, p. 679 (2000).
Elliott, Peter T., et al., *Influence of Terminal Hydrophobe Branching on the Aqueous Solution Behavior of Model Hydrophobically Modified Ethoxylated Urethane Associative Thickeners*, Macromolecules 2003, 36, 8449-8460.
"ACRYSOL RM-825 Rheology Modifier"; Technical Data Sheet; Rhom and Haas; Sep. 2005; 6 pages.
"ACRYSOL RM-2020 Rheology Modifier"; Technical Data Sheet; Rhom and Haas; Dec. 2007; 4 pages.
"MISAO, et al.; Rhegological Behavior of PMMA Power/Associating Polymer Suspensions"; DIC Technical Review; No. 5; pp. 63-70; (1999).

* cited by examiner

*Primary Examiner*—Satya B Sastri
(74) *Attorney, Agent, or Firm*—Cantor Colburn LLP (57) ABSTRACT

A method for improving the viscosity stability of an aqueous composition having a latex polymer and associative thickeners with at least one hydrophilic segment and at least two hydrophobic segments is provided. The associative thickeners are chosen such that one associative thickener has a lower molecular weight than the other associative thickener.

11 Claims, 1 Drawing Sheet

content truncated by length limits …

ASSOCIATIVE THICKENER COMPOSITIONS AND METHODS OF USE

This application claims the benefit of priority under 35 U.S.C. §119(e) of U.S. Provisional Patent Application No. 60/756,306, filed on Jan. 5, 2006, the disclosure of which is incorporated herein by reference.

BACKGROUND

This invention generally relates to associative thickeners. In particular, the present invention relates to associative thickeners having enhanced viscosity stabilization.

In the formulation of aqueous latex paints, a balance between high and low shear viscosities is sought to provide satisfactory applications properties, such as by spraying or brushing, leveling of the applied wet paint film, and minimal sagging of the applied wet paint film. Aqueous latex paints are commonly formulated with various viscosity modifying additives, often referred to as flow modifiers, viscosity modifiers, rheology modifiers, or thickeners, to balance the high and low shear flow properties of the aqueous latex paint. Examples of viscosity modifying additives include cellulosic materials, such as hydroxyethyl cellulose, alkali soluble emulsions, associative thickeners, and ionic polymers. Typically, blends of viscosity-modifying additives are employed to obtain the appropriate balance of high and low shear viscosities.

Associative thickeners operate to thicken aqueous systems to which they are added by the non-specific associations, such as adsorption on dispersed phase surfaces and aggregation in solution akin to micellization, between the hydrophobic groups on the thickener molecules and moieties on the other components in the system, similar to the non-specific associations of conventional surfactants. Because associative thickeners comprise at least two hydrophobic groups, a network of associations is established. This network increases the viscosity of the aqueous composition.

A problem that may occur in paints containing associative thickeners is a drop in mid-shear (Krebs Stormer) viscosity when colorants that contain high levels of surfactant are added. Mid-shear viscosity is the viscosity exhibited when the applied shear rate is in the range of 10 to 100 $\sec^{-1}$. This drop in mid shear viscosity is especially problematic when the paint will be tinted to a deep tone because a high level of surfactant generally accompanies the colorant.

Generally, it is possible to formulate a light tint base at a high enough mid-shear viscosity that colorants added to it will not depress the viscosity to an unacceptable degree. In some instances, combinations of associative thickeners have been found to be less sensitive to colorant addition than the individual thickeners alone. Combinations of two or more associative thickeners are commonly used in paints to obtain the desired balance of high and low shear rate viscosities. These common combinations include a pseudoplastic associative thickener to control the low to mid shear viscosity and a more Newtonian associative thickener to control the high shear viscosity. In attempting to solve the problem of mid-shear viscosity loss upon tinting, U.S. Pat. No. 6,337,366 describes the use of a mixture of a select associative thickener component and a select surfactant component. The ratio of the molecular weight of the surfactant to the molecular weight of the associative thickener is relatively large in comparison to similar components in conventional aqueous systems. However, the required relatively high concentration of surfactant component tends to diminish sag resistance of the paint.

SUMMARY OF THE INVENTION

It has been found in the present invention that by selecting two associative thickeners of a higher and a lower molecular weight and utilizing them in combination in certain concentration ratios, enhanced viscosity stability upon tinting can be obtained. The hydrophobes on the lower molecular weight associative thickener may be chosen to be of greater effective hydrophobicity than the hydrophobes on the higher molecular weight associative thickener. In this case, the lower molecular weight associative thickener is the pseudoplastic thickener and the higher molecular weight associative thickener is the Newtonion thickener. However, for improved viscosity stability to be observed, the lower molecular weight thickener is not required to contain a greater effective hydrophobe than the higher molecular weight thickener.

One aspect of the invention is an aqueous composition comprising a first associative thickener and a second associative thickener with a latex polymer. The first associative thickener has at least two hydrophobic segments and a weight average molecular weight (referred to herein as "Mw") less than 30,000. The second associative thickener has at least two hydrophobic segments and a Mw of at least 1.5 times the Mw of the first associative thickener. The concentration of the second associative thickener is greater than 1.5 times the concentration of the first associative thickener. The hydrophobic segments of the first associative thickener and the second associative thickener have a hydrophobic substituent of at least four carbon atoms.

Another aspect of the invention is a method of improving viscosity stability of an aqueous composition, having a latex polymer, comprising adding to said composition a mixture of a first associative thickener and a second associative thickener. The first associative thickener has at least two hydrophobic segments and a Mw less than 30,000. The second associative thickener has at least two hydrophobic segments and a Mw of at least 1.5 times the Mw of the first associative thickener. The concentration of the second associative thickener is greater than 1.5 times the concentration of the first associative thickener. The hydrophobic segments of the first associative thickener and the second associative thickener have a hydrophobic substituent of at least four carbon atoms.

DETAILED DESCRIPTION

All values of Mw used herein are determined by size exclusion chromatography (referred to as "SEC"), unless otherwise specified.

"KU viscosity" is a measure of the mid-shear viscosity as measured by a Krebs viscometer. The Krebs viscometer is a rotating paddle viscometer that is compliant with ASTM-D562. KU viscosity was measured on a Brookfield Krebs Unit Viscometer KU-1+ available from Brookfield Engineering Labs, Middleboro, Mass. "KU" shall mean Krebs unit.

"Viscosity stability," as used herein, shall mean the ability of an aqueous composition to resist change in viscosity upon the addition of surfactant or a composition containing surfactant. A preferred viscosity stabilizer for latex paints must provide KU viscosity changes of less than about 15 KU upon the addition of up to 12 oz/gal (94 ml/l) of colorant.

As used herein, the prefix "(meth)acryl-" shall mean both the methacryl- and acryl-version of any monomer.

As used herein, "aqueous composition" shall mean a composition that is provided predominantly in water rather than organic solvent. It is contemplated, however, that a minor amount of organic solvent may be included in the composition and that the composition will nonetheless meet the definition of "aqueous composition."

As used herein, "Base paint" shall mean an uncolored paint in liquid form to be colored or tinted. To enable the uncolored paint to be colored or tinted to varying degrees in its final form, the Base paint will contain various levels of titanium dioxide to permit proper coloring or tinting.

"Hydrophobic equivalent," as used herein, shall mean a substituent that is quantitatively equivalent in hydrophobicity to its hydrocarbon analog, including heteroatom-substituted hydrocarbons and siloxane analogs. The quantitative measurement of hydrophobicity is described in Chapters 4 and 5 of C. Hansch and A. Leo, Exploring QSAR—Fundamental and Applications in Chemistry and Biology (Washington, D.C.: American Chemical Society, 1995).

Associative thickeners are water-soluble or water-swellable polymers that have chemically attached hydrophobic groups. No limitations are imposed upon the architecture, that is, the linear or the branched character, of the hydrophilic portion of the polymer. The hydrophilic portions of the polymers may be ionic or non-ionic. Examples of ionic associative thickeners include hydrophobically-modified, alkali-swellable polymers and hydrophobically-modified urethane alkali-swellable polymers. Examples of non-ionic associative thickeners based upon naturally occurring hydrophilic backbones include hydrophobically-modified cellulose ethers. Many other non-ionic associative thickeners are based upon synthetic hydrophilic backbones. In this case, the hydrophilic portion is typically constructed by linking 2,000 to 10,000 molecular weight oxyethylene diols. A variety of different linking agents, including for example epihalohydrins, gem dihalides, diisocyanates and aminoplast resins, may be effective. The linking agents are also used to attach hydrophobic groups to the hydrophilic backbone.

The non-ionic associative thickeners based upon a synthetic hydrophilic backbone comprising oxyethylene diols have traditionally been categorized based upon the residue of the type of linker that is employed. Examples include hydrophobically-modified polyurethanes wherein the linkers are diisocyanates, hydrophobically-modified polyethers wherein the linkers are epihalohydrins and gem dihalides and hydrophobically-modified aminoplast ether polymers wherein the linker is an aminoplast resin. To a significant extent, the thickening behavior of these non-ionic, oxyethylene diol-based polymers is determined by the character of the attached hydrophobic groups and the architecture of the molecules, but not the linker chemistry employed. Thus, the assorted non-ionic, oxyethylene diol-based associative thickening polymers may offer similar properties, even though their linking chemistries vary.

The first and second associative thickeners of the invention are compounds comprising at least one hydrophilic segment and at least two hydrophobic segments. In one embodiment, the Mw of the first associative thickener is greater than 6,000 and less than 30,000 and the Mw of the second associative thickener is greater than 30,000 and less than 100,000. The hydrophobicity of the associative thickener hydrophobic segments is sufficient to form non-specific hydrophobic associations with other hydrophobic surfaces, either on other thickener polymer molecules, or on molecules contained in the system to be thickened. In one embodiment, the associative thickener hydrophobic segments contain a hydrocarbon substituent having at least 4 carbons or its hydrophobic equivalent. In another embodiment, the associative thickener hydrophobic segments contain a hydrocarbon substituent having at least 12 carbons or its hydrophobic equivalent. Preferably, the hydrophobic substituent of this invention is a branched hydrophobe, where the hydrophobic segments of the associative thickener comprise branched carbon chains. A branched hydrophobe is any hydrophobic substituent that contains at least one branch point. A branch point consists of one atom, B, attached to at least 3 other atoms, P1, P2 and P3, that are capable of forming more than one covalent bond. Examples of the branch point atom, B, may include, carbon, nitrogen, silicon or phosphorus, but is not limited to this list. The branch atom, B, is not limited to 3 attachments. The 3 branch atoms, P1, P2, and P3, may include, carbon, nitrogen, oxygen, silicon, phosphorus or sulfur, but is not limited to this list. The branch atoms, P1, P2, and P3 may be the same or different. Q1, Q2, and Q3 may be any atom(s) including hydrogen. Q1, Q2, and Q3 may be the same or different.

The most preferred branched hydrophobes for this invention are based on the Guerbet alcohols or combinations of Guerbet alcohols, of which the general structure is shown below wherein $n^1$ is an integer greater than zero.

Another most preferred hydrophobe substituent is based on phenol (a class of aromatic organic compounds in which one or more hydroxy groups are attached directly to the benzene ring) with two or more substituents on the aromatic ring, examples include, tristyryl phenol, distyryl phenol, dinonyl phenol, diisobutyl phenol.

Each associative thickener component may be present in the composition at a level of at least 0.05% by weight of solids, based on the weight of the composition. Preferably, the associative thickener components may be present in the aqueous composition at a level of at least 0.1% by weight of solids, and most preferably, at a level of at least 0.5% by weight of solids, based on the weight of the composition. The composition may contain rheology modifying agents other than the first associative thickener and second associative thickener.

A variety of conventional techniques may be employed to determine whether the hydrophobicity of the hydrophobic segment of the associative thickener is sufficient to form non-specific, hydrophobic interactions. These techniques generally show a dramatic change in the physico-chemical quantities of the associative thickener material in aqueous solution above and below the critical micelle concentration. For example, if the associative thickener containing the hydrophobic segment exhibits a dramatic change in surface tension as a function of increasing associative thickener concentration in water, then the hydrophobicity of its hydrophobic segment is sufficient to form non-specific hydrophobic interactions. At concentrations below the critical micelle concentration, the measured surface tension decreases with increasing associative thickener concentration. At concentrations above the critical micelle concentration, the measured surface tension takes on an approximately constant value. (Jönsson, Lindman, Holmberg and Kronberg, "Surfactants and Polymers in Aqueous Solution," page 36, John Wiley and Sons, New York, 1998).

Examples of associative thickeners include nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly(meth)acrylic acids, hydrophobically-modified hydroxyethyl cellulose, and hydrophobically-modified poly(acrylamide), and mixtures thereof.

A mixture of different types of associative thickeners may be used for the associative thickener components provided that each different type of associative thickener individually meets the definition of the first and second associative thickener, respectively.

Examples of the chemical structure of associative thickeners useful in the invention are:

R—X—WS—X'—R'

R and R' represent hydrophobic substituents, linear or branched, that are sufficient to form non-specific hydrophobic associations and may be the same or different. Suitable R and R' substituents include hydrocarbons having at least 4 carbon atoms, or the hydrophobic equivalent of at least 4 carbon atoms.

WS represents the hydrophilic segment and is a water-soluble, polymeric substituent. Suitable WS moieties include the polyethers, such as polyethylene oxide (also known as polyethylene glycol), and copolymers of ethylene oxide with comonomers, such as propylene oxide and butylene oxide, both of which can be incorporated randomly or in blocks. Other suitable WS moieties include the polyethers and copolymers of ethylene oxide with comonomers that have been chemically coupled together with appropriate linking agents X, described below. Other suitable monomers, such as epoxides of α-olefins with at least 10 carbons (e.g., the epoxide of 1-decene), result in WS having a pendant hydrophobe(s) of at least 8 carbons, in which case R—X—WS—X'—R' contains more than two hydrophobic segments.

It should be appreciated that the compositions of R or R' and WS depend upon the chemical compositions of the reactants used to form the components of the mixture of the invention. For example, when WS is polyethylene oxide, reaction of the terminal hydroxyl functionality with diisocyanate, followed by reaction of the newly formed isocyanate terminal group(s) with an alcohol, leads to R or R' with hydrophobic contributions from both the diisocyanate and the alcohol.

The X and X' represent the connecting linkage groups and may be the same or different. Suitable linkages include: —O— (ether); —O—C(O)—NH— (urethane); —O—C(O)— (ester); —NY— (imino), —NY—C(O)— (amide), and —NY—C(O)—NH— (urea), where Y=monofunctional organic group; and —S— (sulfide); —O—Si— (siloxane); and -Amp- (glycouril), where Amp is the skeletal residue of an aminoplast as described in U.S. Pat. Nos. 5,627,232 and 5,629,373.

Suitable first and second associative thickeners include those additives disclosed in U.S. Pat. No. 3,770,684, including analogs prepared by reacting 1 mole of polyethylene oxide with 2 moles of R—NCO, to form an associative thickener with urethane as the connecting linkage.

Other suitable associative thickeners include those disclosed in GB-A-1,358,430. These thickeners have the structure:

R—(CH$_2$CH$_2$O)n$^2$-A-(OCH$_2$CH$_2$)n$^2$—OR and are synthesized by connecting two hydroxyl-terminated nonionic surfactants with a diisocyanate (A). The hydrophilic segments of the associative thickeners may contain branching. The n2 denotes an integer from 60 to 400.

Other suitable associative thickeners include: nonionic hydrophobically-modified ethylene oxide urethane copolymers disclosed in U.S. Pat. Nos. 4,079,028 and 5,973,063; nonionic hydrophobically-modified ethylene oxide urethane copolymers containing pendant hydrophobes disclosed in U.S. Pat. Nos. 4,496,708, 5,023,309, and 4,499,233; and nonionic hydrophobically-modified ethylene oxide urea-urethane copolymers disclosed in U.S. Pat. No. 6,870,024.

Additional suitable associative thickeners include nonionic hydrophobically-modified ethylene oxide ether copolymers disclosed in U.S. Pat. Nos. 6,002,049, 5,877,245, 5,728,895 and 5,574,127; and nonionic hydrophobically-modified ethylene oxide glycouril copolymers disclosed in U.S. Pat. Nos. 5,973,063 and 5,629,373 and EP1208147.

Other suitable associative thickeners for forming the mixtures of the invention are water-soluble polymers prepared via free radical polymerization. These water-soluble polymers are polymers of water soluble monomers, but may contain some water insoluble monomers, provided that the resultant polymer is water-soluble. The water-soluble monomers include (meth)acrylic acid, (meth)acrylamide (and analogs having substituents on the amide nitrogen), vinyl alcohol (from polymerization of vinyl acetate, followed by hydrolysis), and hydroxyalkyl(meth)acrylate. The hydrophobic segments can be introduced by:

(1) adding hydrophobic chain transfer agents such as dodecyl mercaptan during polymerization;

(2) adding free radical-polymerizable hydrophobic monomers, such as decyl methacrylate, nonionic urethane monomers which are the urethane reaction product of a monohydric nonionic surfactant with a monoethylenically unsaturated monoisocyanate, preferably one lacking ester groups like alpha, alpha-dimethyl-m-isopropenyl benzyl isocyanate, or carboxylic acid monomers, nonionic vinyl monomers or nonionic vinyl surfactant esters during polymerization; and (3) adding, post reaction, for example, esterification of polymeric acid functionality with hydrophobe-containing alcohols, such as dodecanol, or a nonionic surfactant.

The composition includes a latex polymer, which may comprise any of the types conventionally utilized in latex paint compositions and includes natural rubber latex ingredients and synthetic latices. The latex polymer is dispersed as polymer particles in the aqueous media of the composition and may have average particle diameters in the range of 20 nm to 1000 nm. The latex polymer may be an emulsion polymer of mono- or poly-ethylenically unsaturated olefinic, vinyl or acrylic monomer types, including homopolymers and copolymers of such monomers. Specifically, the latex polymer may comprise acrylic (co)polymers, vinyl acetate copolymers, vinyl/acrylic copolymers, styrene/acrylic copolymers, polyurethanes, polyureas, polyepoxides, polyvinyl chlorides, ethylene/vinyl acetate copolymers, styrene/butadiene copolymers, polyester polymer, polyethers, and mixtures thereof.

The composition optionally contains other additives, such as a colorant and a macromolecular organic compound having a hydrophobic cavity.

Suitable colorants include inorganic colorant particles and organic colorant particles. Suitable inorganic colorant particles include, but are not limited to, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass. One group of preferred inorganic colorant particles is selected from bismuth pigments; mixed metal oxide pigments; chromate and molybdate pigments; ultramarine pigments; cobalt oxide pigments; nickel antimony titanates; lead chrome; blue iron pigments; carbon black; and metal effect pigments.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

The composition may also contain other additives, such as pigments, extenders, surfactants, salts, buffers, pH adjustment agents such as bases and acids, biocides, mildewcide, wetting agents, defoamers, dispersants, dyes, water miscible organic solvents, anti-freeze agents, corrosion inhibitors, adhesion promoters, waxes, and crosslinking agents. In one non-limiting embodiment, a composition is provided that contains a nonionic associative thickener and at least one material selected from pigment, extender, or colorant.

Examples of suitable pigments include zinc oxide, antimony oxide, zirconium oxide, chromium oxide, iron oxide, lead oxide, zinc sulfide, lithopone, and titanium dioxide such as, for example, anatase and rutile titanium dioxide.

Examples of suitable extenders include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc.

The method of the invention is useful for improving viscosity stability of an aqueous composition, particularly upon the addition of a colorant containing high levels of surfactant. The method of the invention is not limited by the type of colorant that is added to the aqueous system and is useful for any colorant that contains surfactant or other additives that may interfere with the non-specific associations of the associative thickeners added to the aqueous system.

The first and second associative thickeners may be added separately to the aqueous composition. The first and second associative thickeners may also be blended and added to the aqueous composition as a mixture. The mixture or its component parts may be provided in the form of a dry powder, a premixed aqueous solution or a slurry or solution in a water compatible solvent. The media that serves to disperse or solubilize the associative thickeners may contain water-miscible solvents, non-volatile thinners, surfactants, wetting agents, dispersants and/or macromolecular organic compounds having a hydrophobic cavity. The macromolecular organic compounds include cyclodextrin and its derivatives.

The first and second associative thickeners may also be added separately to different components of the aqueous composition.

The method of the invention is useful for aqueous systems containing latex, such as paints (including architectural paints and metal coatings, such as automotive finishes), coatings, synthetic plaster, adhesives, sealants, and inks. The method of the invention also provides desirable flow and leveling properties to paints while maintaining exceptional sag resistance. The desirable flow and/leveling properties are exhibited when the paint, untinted or tinted, is applied to a substrate by brush. The brush marks in the paint level before the paint is immobilized result from the drying process. Sag resistance refers to the ability of the wet paint to resist sagging or dripping under the influence of gravitational force after the paint is applied to a vertical substrate. When a paint exhibits enhanced sag resistance, a wet coating of paint may be applied in relatively greater thickness to the vertical substrate without the onset of objectionable sagging or dripping. It is typically observed that formulation changes that engender improved sag resistance tend to degrade flow and leveling on brushout. Thus, formulators usually must strike a balance of flow and leveling performance versus sag resistance performance. This balance is henceforth described as sag/flow balance. When less compromise in either of the two properties is required to strike the sag/flow balance, the sag/flow balance is enhanced. It has been noted that by employing the method of this invention, that an unusually beneficial sag/flow balance may be obtained. The enhanced sag/flow balance afforded by this invention has particular applicability in thixotropic paints. Thixotropic paints can be described as paints that appear gel-like when they have not been sheared. The gel structure allows relatively large quantities of paint to be loaded onto the substrate in one stroke. Thixotropic paints exhibit good sag resistance. However, a problem with thixotropic paints is that they exhibit very poor flow and leveling. Thixotropic paints that display improved flow and leveling can be produced by using the method of this invention.

The following examples are presented to illustrate the invention. In the examples, the following abbreviations have been used:

"HMDI" is 4,4'-Methylenebis(cyclohexyl isocyanate).

"IPDI" is isophorone diisocyanate.

"PEG" is polyethylene glycol.

"Mn" is number average molecular weight.

"Mw" is weight average molecular weight.

"SEC" is size exclusion chromatography.

"ICI" is the viscosity, expressed in units of poise, measured on a high shear rate, cone and plate viscometer known as an ICI viscometer. An ICI viscometer is described in ASTM D4287. It measures the viscosity of a paint at approximately 10,000 sec-1. ICI viscosities of paints were measured on a viscometer manufactured by Research Equipment London, Ltd. An equivalent ICI viscometer is the Elcometer 2205 manufactured by Elcometer, Incorporated in Rochester Hills, Mich. The ICI of a paint typically correlates with the amount of drag force experienced during brush application of the paint.

"Base" is uncolored paint to be colored or tinted. To enable this uncolored paint to be colored or tinted to varying degrees, the uncolored paint will contain various levels of titanium dioxide to permit proper coloring or tinting.

A wide range of colorant concentrations can be added and mixed into the Base. However, in the examples, tinted refers to a paint tinted with the equivalent of 12 ounces of colorant per gallon of final tinted paint.

Determination of Molecular Weights of the Nonionic Associative Thickeners

The weight average molecular weights and the number average molecular weights of the nonionic associative thickeners and the PEG molecules were determined using size exclusion chromatography. The separations were carried out on a high performance liquid chromatograph, which included an Agilent 1100 Model isocratic pump and an autosampler (Waldbronn, Germany), an Eppendorf CH-430 Model column oven (Madison, Wis.), and Waters 410 Model differential refractometer (Milford, Mass.). The oven and the refractometer were operated at 40° C. System control, data acquisition, and data processing were performed using Caliber® software (Polymer Laboratories, Church Stretton, UK).

Samples were prepared in tetrahydrofuran (THF) at concentrations of 2 milligram/milliliter (mg/ml) and filtered using 0.45 micron filter.

The SEC separations were performed in THF (certified grade) at 1 milliliter/minute using a SEC column set having three PLgel columns (300×7.5 mm ID) packed with polystyrene-divinylbenzene gel (pore size marked as 100 Å, $10^3$ Å and $10^4$ Å, particle size 5 microns) purchased from Polymer Laboratories (Church Stretton, UK). The sample size was 100 microliters with concentration C=2 milligram/milliliter. The molar mass characteristics of the analyzed samples were calculated based on polystyrene standards (Polymer Laboratories, Church Stretton, UK).

THICKENER EXAMPLE 1

A mixture of 77.0 g PEG (Mw=8000) and 150.0 g toluene was dried by azeotropic distillation. The mixture was then cooled to 90° C., and 10.8 g HMDI and 0.2 g dibutyltin dilaurate were added. After 1 hour at 90° C. with stirring, 17.3 g 1-hexadecanol was added. 1-hexadecanol is a linear alcohol. The mixture was then held at 90° C. with stirring for another hour. The resulting solid polymer was isolated after toluene evaporation. The resulting solid polymer, isolated after toluene evaporation, had a Mw of 19,000 and a Mn of 15,500 as determined by SEC.

THICKENER EXAMPLE 2

A mixture of 77.0 g PEG (Mw=8000) and 150.0 g toluene was dried by azeotropic distillation. The mixture was also cooled to 90° C., and 10.8 g HMDI and 0.2 g dibutyltin dilaurate were added. After 1 hour at 90° C. with stirring, 17.3 g Isofol® 16 (Sasol, Inc.), a branched alcohol, was added. The mixture was then held at 90° C. with stirring for another hour. The resulting solid polymer, isolated after toluene evaporation, had a Mw of 18,600 and a Mn of 14,800 as determined by SEC.

THICKENER EXAMPLE 3

A mixture of 77.0 g PEG (Mw=8000) and 150.0 g toluene was dried by azeotropic distillation. The mixture was then cooled to 90° C., and 10.8 g HMDI and 0.2 g dibutyltin dilaurate were added. After 1 hour at 90° C. with stirring, 19.7 g Isofol® 18T (Sasol, Inc.) was added. Isofol® 18T is a mixture of the following branched alcohols, 2-hexyl 1-decanol, 2-octyl 1-decanol, 2-hexyl 1-dodecanol and 2-octyl 1-dodecanol. The mixture was then held at 90° C. with stirring for another hour. The resulting solid polymer, isolated after toluene evaporation, had a Mw of 18,800 and a Mn of 15,100 as determined by SEC.

THICKENER EXAMPLE 4

A mixture of 138.0 g PEG (Mw=8000) and 250.0 g toluene was dried by azeotropic distillation. The mixture was cooled to 90° C., and 10.8 g HMDI and 0.2 g dibutyltin dilaurate were added. After 1 hour at 90° C. with stirring, 13.7 g 1-hexadecanol was added. The mixture was then held at 90° C. with stirring for another hour. The resulting solid polymer, isolated after toluene evaporation, had a Mw of 26,100 and a Mn of 19,100 as determined by SEC.

THICKENER EXAMPLE 5

A mixture of 138.0 g PEG (Mw=8000) and 250.0 g toluene was dried by azeotropic distillation. The mixture was cooled to 90° C., and 10.8 g HMDI and 0.2 g dibutyltin dilaurate were added. After 1 hour at 90° C. with stirring, 13.7 g Isofol® 16 (Sasol, Inc.) was added. The mixture was then held at 90° C. with stirring for another hour. The resulting solid polymer, isolated after toluene evaporation, had a Mw of 26,200 and a Mn of 19,000 as determined by SEC.

THICKENER EXAMPLE 6

A mixture of 138.0 g PEG (Mw=8000) and 250.0 g toluene was dried by azeotropic distillation. The mixture was cooled to 90° C., and 10.8 g HMDI and 0.2 g dibutyltin dilaurate were added. After 1 hour at 90° C. with stirring, 15.2 g Isofol® 18T (Sasol, Inc.) was added. The mixture was then held at 90° C. with stirring for another hour. The resulting solid polymer, isolated after toluene evaporation, had a Mw of 26,300 and a Mn of 18,900 as determined by SEC.

THICKENER EXAMPLE 7

A mixture of 200.0 g PEG (Mw=8000) and 350.0 g toluene was dried by azeotropic distillation. The mixture was cooled to 90° C., and 14.0 g HMDI and 0.2 g dibutyltin dilaurate were added. After 1 hour at 90° C. with stirring, 7.0 g 1-hexanol was added. The mixture was then held at 90° C. with stirring for another hour. The resulting solid polymer, isolated after toluene evaporation, had a Mw of 27,200 and a Mn of 18,800 as determined by SEC.

THICKENER EXAMPLE 8

A mixture of 200.0 g PEG (Mw=8000) and 340.0 g toluene was dried by azeotropic distillation. The mixture was cooled to 90° C., and 10.8 g HMDI, 2.7 g 1-hexanol, and 0.2 g dibutyltin dilaurate were added. After 1 hour at 90° C. with stirring, 2.0 g 1-hexanol was added. The mixture was then held at 90° C. with stirring for another hour. The resulting solid polymer, isolated after toluene evaporation, had a Mw of 33,900 and a Mn of 22,900 as determined by SEC.

THICKENER EXAMPLE 9

A mixture of 260.0 g PEG (molecular weight 8000) and 400.0 g toluene was dried by azeotropic distillation. The mixture was cooled to 90° C., and 10.8 g HMDI, 1.5 g 1-hexanol and 0.2 g dibutyltin dilaurate were added. After 1 hour at 90° C. with stirring, 2.0 g 1-hexanol was added. The mixture was then held at 90° C. with stirring for another hour. The resulting solid polymer, isolated after toluene evaporation, had a Mw of 45,300 and a Mn of 30,300 as determined by SEC.

Category A and B Thickeners

The two associative thickeners are categorized by molecular weight. The lower molecular weight thickener of the two is categorized as a Category A thickener and the higher molecular weight thickener of the two is categorized as a Category B thickener. The thickener examples are assigned names which describe their category, their Mw as measured by SEC, the capping alcohol employed and whether the hydrophobe substituent is branched (B) or linear (L). The naming convention is as follows:

Category-Mw-#Carbons in capping alcohol—Branched versus Linear hydrophobe substituent

| Thickener Example | Thickener Name | Capping Alcohol | Branched or linear hydrophobe substituent | SEC Mw, × 1000 |
|---|---|---|---|---|
| 1 | A-19K-C16-L | 1-Hexadecanol | Linear | 19 |
| 2 | A-19K-C16-B | 2-Hexyl-1-decanol | Branched | 19 |
| 3 | A-19K-C18-B | Isofol 18T | Branched | 19 |
| 4 | A-26K-C16-L | 1-Hexadecanol | Linear | 26 |
| 5 | A-26K-C16-B | 2-Hexyl-1-decanol | Branched | 26 |
| 6 | A-26K-C18-B | Isofol 18T | Branched | 26 |
| 7 | B-27K-C6-L | Hexanol | Linear | 27 |
| 8 | B-34K-C6-L | Hexanol | Linear | 34 |
| 9 | B-45K-C6-L | Hexanol | Linear | 45 |

The performance obtained by the use of associative thickeners of selected molecular weight is demonstrated in a latex paint composition. A latex unthickened paint composition, Pre-paint #1, was prepared by combining:

| | |
|---|---|
| Kronos 4311 titanium dioxide slurry | 262.8 g |
| Water | 150.1 g |
| Ethylene glycol | 24.3 g |
| Ropaque Ultra | 49.7 g |
| Rhoplex SG-30 binder | 420.9 g |
| Drewplus L-475 defoamer | 4.0 g |
| Texanol | 19.2 g |
| Total | 931.0 g |

Kronos 4311 is a product of Kronos Incorporated, Chelmsford, Mass.

Ropaque Ultra and Rhoplex SG-30 are products of Rohm and Haas Company, Philadelphia, Pa.

Drewplus L-475 is a product of Ashland Specialty Chemical Company, Dublin, Ohio.

The formulated Base paint was obtained by adding thickener and water to 931 g of Pre-paint #1. To maintain constant solids of the fully formulated Base paint, the combined weight of added thickeners and water equals 82 g. The density of the fully formulated Base paint was 1013 pounds per 100 gallons (1.2 kg per liter). Thickeners were added as aqueous dispersions. The Category A thickeners were added as 18% thickener dispersions in a 75 water/25 diethylene glycol monobutyl ether solvent. The Category A thickener solids were dispersed by slow tumbling in 75 water/25 diethylene glycol monobutyl ether overnight. Category B thickeners were added as 20% thickener dispersion in water. The Category B thickener solids were dispersed by slow tumbling in water overnight.

Paint Bases were made by the following method. To 931 g Pre-paint #1, an amount of aqueous thickener dispersion (Category A or B) and an amount of water were slowly added and stirred on a lab mixer for ten minutes. The total combined amount of aqueous thickener dispersions and water is 82 grams. In the following data presentation, thickener concentrations in the paint Base are described in terms of dry grams of thickener added. For exams, a concentration of 3 dry grams of a Category A thickener and 6 dry grams of a Category B thickener was obtained in the Base paint by adding 16.67 grams of 18% Category A thickener dispersion, 30 grams of 20% Category B thickener dispersion and 35.33 grams of water to 931 grams of Pre-paint #1. Following a 24 hour equilibration at room temperature, the thickened paint Base was stirred for one minute on a lab mixer before measuring viscosity values. The KU viscosity and the ICI viscosity values prior to tinting are described as KU Base and ICI Base, respectively.

Tinted paints were produced by adding 23.5 g of colorant to 200 g of Base paint followed by mixing on a paint shaker for 10 minutes. The colorant is the blue (BB) colorant supplied by Benjamin Moore and Company, Montvale, N.J. in their Color Preview line of colorants. The concentration of colorant is equivalent to 12 ounces of colorant in one gallon (94 ml of colorant per liter) of final tinted paint. A paint tinted to 12 ounces per gallon is generally known as a deep tone paint. KU viscosities and ICI viscosities were measured one hour after tinting. The viscosity measurement was preceded by the one minute of stirring on a mechanical mixer. KU Tinted is the KU viscosity of the Base paint one hour after tinting. ICI Tinted is the ICI viscosity of the Base paint one hour after tinting. Delta KU is the KU viscosity of the tinted paint minus the KU viscosity of the Base paint. If Delta KU is negative, then KU Loss can be defined and it is defined as the absolute value of Delta KU. A KU Loss of less than 15 units is desirable.

COMPARATIVE PAINT EXAMPLES 1-3

To demonstrate the performance of Category A thickeners used in the absence of Category B thickeners, paints were formulated with 3 dry grams of Category A thickeners. Attempts to incorporate 3 dry grams of A-19K-C16-L, A-19K-C16-B, A-19K-C18-B, A-26K-C16-L, A-26K-C16-B or A-26K-C18-B into the paint without a secondary thickener were unsuccessful. The Category A thickeners did not disperse or solubilize into the paint in the absence of a secondary thickener.

To demonstrate the performance of Category B thickeners used in the absence of category A thickeners, paints were formulated with 6 dry grams of Category B thickeners with no added Category A thickener.

TABLE 1

6 dry grams of Category B Thickeners

| Paint Example | 6 dry grams Thickener B | KU Base | KU Tinted | Delta KU | ICI Base | ICI Tinted |
|---|---|---|---|---|---|---|
| 1 | B-27K-C6-L | 107 | 68 | −39 | 1.00 | 1.00 |
| 2 | B-34K-C6-L | 78 | 58 | −20 | 0.85 | 0.60 |
| 3 | B-45K-C6-L | 73 | 56 | −17 | 1.00 | 0.60 |

The use of Category B thickeners in the absence of Category A thickeners does not provide an acceptably low KU Loss and an acceptably high KU Base. An acceptable KU Base value is greater than or equal to 85.

COMPARATIVE PAINT EXAMPLES 4-12

TABLE 2

3 dry g Category A Thickeners (Mw = 19,000) and 3 dry g Category B Thickeners. Ratio of Category B Thickener concentration to Category A Thickener concentration is 1.0.

| Paint Example | 3 dry lbs Thickener A | 3 dry lbs Thickener B | Mw(B)/ Mw(A) | KU Base | KU Tinted | Delta KU | ICI Base | ICI Tinted |
|---|---|---|---|---|---|---|---|---|
| 4 | A-19K-C16-L | B-27K-C6-L | 1.42 | 113 | 70 | −43 | 0.70 | 0.80 |
| 5 | A-19K-C16-L | B-34K-C6-L | 1.79 | 97 | 63 | −34 | 0.50 | 0.60 |
| 6 | A-19K-C16-L | B-45K-C6-L | 2.37 | 82 | 61 | −21 | 0.85 | 0.50 |
| 7 | A-19K-C16-B | B-27K-C6-L | 1.42 | 108 | 76 | −32 | 0.60 | 0.65 |
| 8 | A-19K-C16-B | B-34K-C6-L | 1.79 | 96 | 70 | −26 | 0.55 | 0.50 |
| 9 | A-19K-C16-B | B-45K-C6-L | 2.37 | 100 | 71 | −29 | 0.60 | 0.45 |
| 10 | A-19K-C18-B | B-27K-C6-L | 1.42 | 114 | 70 | −44 | 0.80 | 0.70 |
| 11 | A-19K-C18-B | B-34K-C6-L | 1.79 | 92 | 63 | −29 | 0.75 | 0.60 |
| 12 | A-19K-C18-B | B-45K-C6-L | 2.37 | 78 | 64 | −14 | 0.80 | 0.50 |

Comparative paints 4-12 demonstrate that the use of Category A Thickeners at a Mw of 19,000 in a ratio of 1 to 1 with varied molecular weight Category B Thickeners does not provide a low KU Loss. Although Paint Example 12 exhibits a relatively low KU loss value, the initial KU Base value for the untinted Base is unsuitably low.

COMPARATIVE PAINT EXAMPLES 13-21

TABLE 3

3 dry g Category A Thickener (Mw = 26,000) and 3 dry g Category B Thickener. Ratio of Category B Thickener concentration to Category A Thickener concentration is 1.0.

| Paint Example | 3 dry lbs Thickener A | 3 dry lbs Thickener B | Mw(B)/ Mw(A) | KU Base | KU Tinted | Delta KU | ICI Base | ICI Tinted |
|---|---|---|---|---|---|---|---|---|
| 13 | A-26K-C16-L | B-27K-C6-L | 1.04 | 110 | 77 | −33 | 0.60 | 1.10 |
| 14 | A-26K-C16-L | B-34K-C6-L | 1.31 | 103 | 68 | −35 | 0.55 | 0.60 |
| 15 | A-26K-C16-L | B-45K-C6-L | 1.73 | 103 | 67 | −36 | 0.60 | 0.60 |
| 16 | A-26K-C16-B | B-27K-C6-L | 1.04 | 108 | 85 | −23 | 0.60 | 0.90 |
| 17 | A-26K-C16-B | B-34K-C6-L | 1.31 | 104 | 78 | −26 | 0.60 | 0.70 |
| 18 | A-26K-C16-B | B-45K-C6-L | 1.73 | 109 | 75 | −34 | 0.60 | 0.60 |
| 19 | A-26K-C18-B | B-27K-C6-L | 1.04 | 116 | 77 | −39 | 0.65 | 0.70 |
| 20 | A-26K-C18-B | B-34K-C6-L | 1.31 | 107 | 71 | −36 | 0.65 | 0.65 |
| 21 | A-26K-C18-B | B-45K-C6-L | 1.73 | 103 | 72 | −31 | 0.70 | 0.60 |

Comparative paints 13-21 demonstrate that the use of Category A Thickeners at a Mw of 26,000 in a concentration ratio of 1 to 1 with varied molecular weight Category B Thickeners does not provide a low KU Loss behavior.

Figure 1:
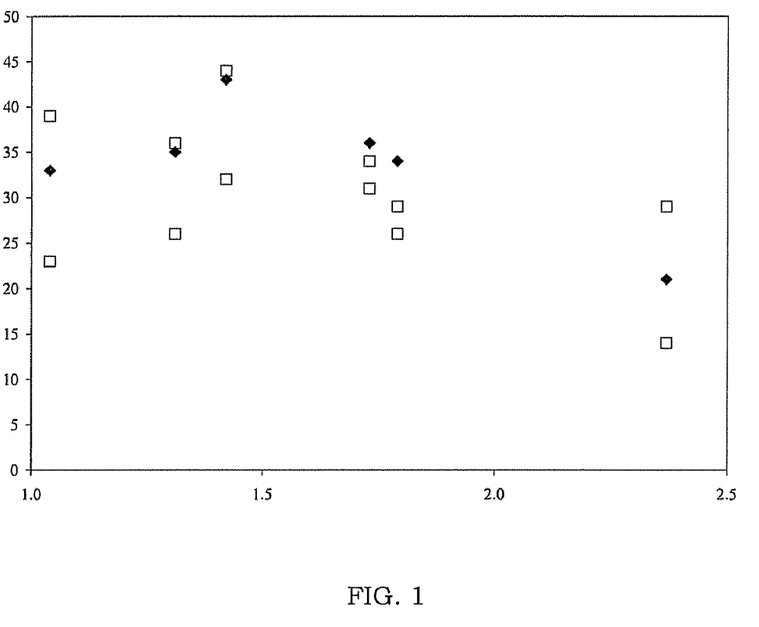
FIG. 1 is a graph of KU loss versus ratio of Mw(B) to Mw(A).

The results of comparative paint examples 4-21 are plotted in FIG. 1, which displays KU Loss upon tinting with blue colorant versus the ratio of Mw (Category B Thickener) to Mw (Category A Thickener). In FIG. 1, ♦ represents the linear hydrophobe and □ represents the branched hydrophobe. The ratio of concentration of Category B Thickener to concentration of Category A Thickener is 1.0.

TABLE 4

3 dry g Thickener A (Mw = 19,000) and 6 dry g Thickener B. Ratio of Thickener B concentration to Thickener A concentration is 2.0.

| Paint Example | 3 dry lbs Thickener A | 6 dry lbs Thickener B | Mw(B)/ Mw(A) | KU Base | KU Tinted | Delta KU | ICI Base | ICI Tinted |
|---|---|---|---|---|---|---|---|---|
| 22 | A-19K-C16-L | B-27K-C6-L | 1.42 | 121 | 96 | −25 | 1.10 | 1.90 |
| 23 | A-19K-C16-L | B-34K-C6-L | 1.79 | 101 | 83 | −18 | 1.00 | 1.20 |
| 24 | A-19K-C16-L | B-45K-C6-L | 2.37 | 95 | 82 | −13 | 1.05 | 1.25 |
| 25 | A-19K-C16-B | B-27K-C6-L | 1.42 | 120 | 99 | −21 | 1.05 | 1.70 |
| 26 | A-19K-C16-B | B-34K-C6-L | 1.79 | 106 | 91 | −15 | 1.00 | 1.35 |
| 27 | A-19K-C16-B | B-45K-C6-L | 2.37 | 95 | 88 | −7 | 0.95 | 1.10 |
| 28 | A-19K-C18-B | B-27K-C6-L | 1.42 | 116 | 96 | −20 | 1.00 | 1.75 |
| 29 | A-19K-C18-B | B-34K-C6-L | 1.79 | 101 | 87 | −14 | 0.90 | 1.20 |
| 30 | A-19K-C18-B | B-45K-C6-L | 2.37 | 93 | 85 | −8 | 1.05 | 1.15 |

TABLE 5

3 dry g Thickener A (Mw = 26,000) and 6 dry g Thickener B. Ratio of Thickener B concentration to Thickener A concentration is 2.0.

| Paint Example | 3 dry lbs Thickener A | 6 dry lbs Thickener B | Mw(B)/ Mw(A) | KU Base | KU Tinted | Delta KU | ICI Base | ICI Tinted |
|---|---|---|---|---|---|---|---|---|
| 31 | A-26K-C16-L | B-27K-C6-L | 1.04 | 130 | 92 | −38 | 0.90 | 2.05 |
| 32 | A-26K-C16-L | B-34K-C6-L | 1.31 | 116 | 84 | −32 | 0.90 | 1.45 |
| 33 | A-26K-C16-L | B-45K-C6-L | 1.73 | 108 | 84 | −24 | 1.00 | 1.40 |
| 34 | A-26K-C16-B | B-27K-C6-L | 1.04 | 125 | 96 | −29 | 1.05 | 2.00 |
| 35 | A-26K-C16-B | B-34K-C6-L | 1.31 | 113 | 88 | −25 | 1.00 | 1.50 |
| 36 | A-26K-C16-B | B-45K-C6-L | 1.73 | 106 | 88 | −18 | 1.00 | 1.40 |
| 37 | A-26K-C18-B | B-27K-C6-L | 1.04 | 125 | 100 | −25 | 1.10 | 2.10 |
| 38 | A-26K-C18-B | B-34K-C6-L | 1.31 | 119 | 90 | −29 | 1.00 | 1.40 |
| 39 | A-26K-C18-B | B-45K-C6-L | 1.73 | 111 | 89 | −22 | 1.00 | 1.30 |

Figure 2:
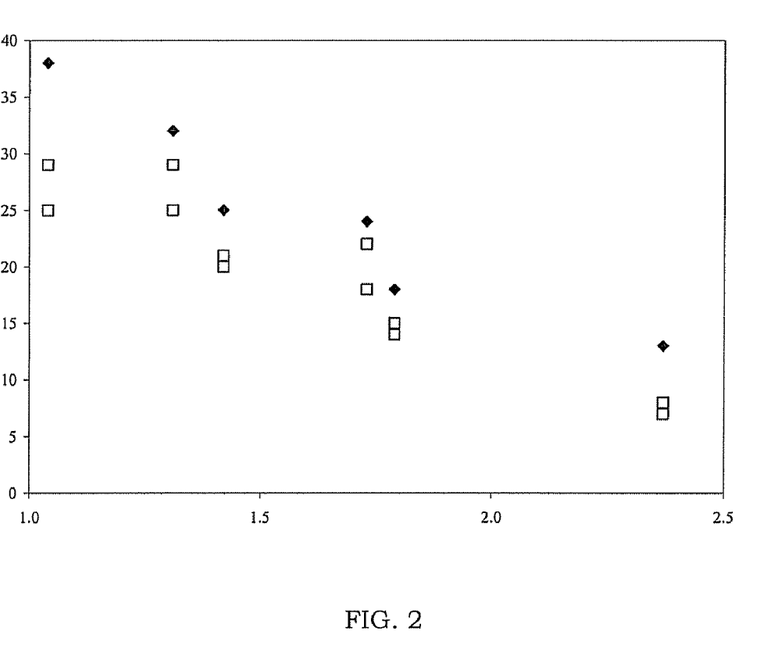
FIG. 2 is a graph of KU loss versus ratio of Mw(B) to Mw(A).

FIG. 2 displays a KU Loss upon tinting with 12 ounces of blue colorant versus ratio of Mw (Thickener B) to Mw (Thickener A). The ratio of concentration of Thickener B to concentration of Thickener A is 2.0. In FIG. 2, ♦ represents the linear hydrophobe and □ represents the branched hydrophobe. The results in FIG. 2 demonstrate that selecting the ratio of molecular weight of the Category B Thickener to the molecular weight of the Category A Thickener to be greater than 1.5 yields lower KU Loss values. In addition, even though they are similar in effective hydrophobicity, the branched hydrophobes exhibit lower KU Loss values than the linear hydrophobes.

THICKENER EXAMPLE 10

A mixture of 77.0 g PEG (Mw=8000) and 200.0 g toluene was dried by azeotropic distillation. The mixture was cooled to 90° C., and 6.95 g HMDI and 0.2 g dibutyltin dilaurate were added. After 1 hour at 90° C. with stirring, 91.8 g tristyrylphenol ethoxylate (dried by azeotropic distillation, average molecular weight=1286) was added. The mixture was then held at 90° C. with stirring for another hour. The resulting solid polymer, isolated after toluene evaporation, had a Mw of 17,100 and a Mn of 13,800 as determined by SEC. The structure of tristyrylphenol ethoxylate, in general, is:

For Thickener Examples 10 and 11, $n^3$ is approximately equal to 20.

THICKENER EXAMPLE 11

A mixture of 165.0 g PEG (Mw=8000) and 325.0 g toluene was dried by azeotropic distillation. The mixture was cooled to 90° C., and 10.9 g IPDI and 0.2 g dibutyltin dilaurate were added. After 1 hour at 90° C. with stirring, 86.3 g tristyrylphenol ethoxylate (dried by azeotropic distillation, Mw=1286) was added. The mixture was then held at 90° C. with stirring for another hour. The resulting solid polymer, isolated after toluene evaporation, had a Mw of 17,700 and a Mn of 14,200 as determined by SEC.

Thickener Examples 10 and 11 were dispersed identically as the other Category A thickeners, as previously described, and are examples of branched aromatic hydrophobe substituents. Thickener Examples 10 and 11 are categorized as Category A thickeners because of their relatively low molecular weight and are assigned names as follows.

| Thickener Example | Thickener Name | Capping Surfactant | Branched or linear Hydrophobe substituent | SEC Mw, × 1000 |
|---|---|---|---|---|
| 10 | A-17K-TSP-B | Tristyrylphenol ethoxylate | Branched | 17 |
| 11 | A-18K-TSP-B | Tristyrylphenol ethoxylate | Branched | 18 |

Thickener Examples 10 and 11 were used in combination with Category B thickeners to formulate a Base paint as previously described. The Base paints were then tinted with phthalo blue as previously described.

TABLE 6

3 dry g Thickener A (endcapped with tristyrylphenol ethoxylate alcohol) and 6 dry g Thickener B. Ratio of Thickener B concentration to Thickener A concentration is 2.0.

| Paint Example | 3 dry lbs Thickener A | 6 dry lbs Thickener B | Mw(B)/ Mw(A) | KU Base | KU Tinted | Delta KU | ICI Base | ICI Tinted |
|---|---|---|---|---|---|---|---|---|
| 40 | A-17K-TSP-B | B-27K-C6-L | 1.59 | 107 | 79 | −28 | 1.10 | 1.25 |
| 41 | A-17K-TSP-B | B-34K-C6-L | 2.00 | 83 | 71 | −12 | 0.90 | 0.80 |

TABLE 6-continued 3 dry g Thickener A (endcapped with tristyrylphenol ethoxylate alcohol) and 6 dry g
Thickener B. Ratio of Thickener B concentration to Thickener A concentration is 2.0.

| Paint Example | 3 dry lbs Thickener A | 6 dry lbs Thickener B | Mw(B)/ Mw(A) | KU Base | KU Tinted | Delta KU | ICI Base | ICI Tinted |
|---|---|---|---|---|---|---|---|---|
| 42 | A-17K-TSP-B | B-45K-C6-L | 2.53 | 74 | 71 | −3 | 0.95 | 0.75 |
| 43 | A-18K-TSP-B | B-27K-C6-L | 1.50 | 112 | 92 | −20 | 1.05 | 1.50 |
| 44 | A-18K-TSP-B | B-34K-C6-L | 1.89 | 91 | 82 | −9 | 0.70 | 1.10 |
| 45 | A-18K-TSP-B | B-45K-C6-L | 2.50 | 82 | 84 | +2 | 1.0 | 1.05 |

Thickener Examples 10-11 and the paint results in Table 6 demonstrate that thickeners end-capped with alkyl ethoxylate alcohols, as Category A thickeners, display reduced KU Loss if relative molecular weights and concentrations are selected as prescribed in this invention. Compared to the hazy dispersions obtained with alkyl alcohol end-capped thickeners, thickeners end-capped with alkyl ethoxylate alcohols tend to exhibit clear, transparent aqueous dispersions. The molecule formed by the reaction product of two alkyl ethoxylate alcohols and a diisocyanate is generally water soluble when the ethoxylate chain length is sufficient. Whereas, the molecule formed by the reaction product of two alkyl alcohols and a diisocyanate is generally water insoluble, resulting in a hazy aqueous dispersion.

What is claimed is:

1. An aqueous composition, comprising:
a first associative thickener having at least one hydrophilic segment and at least two hydrophobic segments and a Mw of 6,000 to 21,000;
a second associative thickener having at least one hydrophilic segment and at least two hydrophobic segments and a Mw of 30,000 to 100,000; and
a latex polymer,
wherein the Mw of the second associative thickener is at least 1.5 times the Mw of the first associative thickener,
the hydrophobic segments of the first associative thickener and the second associative thickener have a hydrophobic substituent of at least four carbon atoms, and
a concentration of the second associative thickener is greater than 1.5 times a concentration of the first associative thickener
wherein the first and second associative thickeners each comprise a thickener selected from the group consisting of nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly(meth) acrylic acids, and hydrophobically-modified poly(acrylamide), and mixtures thereof.

2. The composition of claim 1 wherein the hydrophobic substituent comprises at least one of a phenol, a substituted phenol, and a Guerbet alcohol.

3. The composition of claim 1 further comprising at least one of a colorant, pigment, extender, surfactant, salt, buffer, pH adjustment agent, biocide, mildewcide, wetting agent, defoamer, dispersant, dye, water miscible organic solvent, anti-freeze agent, corrosion inhibitor, adhesion promoter, wax, and crosslinking agent.

4. The composition of claim 1 wherein the first associative thickener and the second associative thickener comprise at least 0.1% by weight of solids, based on a weight of the aqueous composition.

5. A method of improving viscosity stability of an aqueous composition, having a latex polymer, comprising adding to the composition a mixture comprising:
a first associative thickener having at least one hydrophilic segment and at least two hydrophobic segments and a Mw of 6,000 to 21,000;
a second associative thickener having at least one hydrophilic segment and at least two hydrophobic segments and a Mw of 30,000 to 100,000,
wherein the Mw of the second associative thickener is at least 1.5 times the Mw of the first associative thickener,
the hydrophobic segments of the first associative thickener and the second associative thickener have a hydrophobic substituent of at least four carbon atoms,
and a concentration of the second associative thickener is greater than 1.5 times a concentration of the first associative thickener,
wherein the first and second associative thickeners each comprise a thickener selected from the group consisting of nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly(meth) acrylic acids, and hydrophobically-modified poly(acrylamide), and mixtures thereof.

6. The method of claim 5 wherein the first associative thickener and the second associative thickener are added at a level of at least 0.1% by weight of solids, based on a weight of the aqueous composition.

7. The composition of claim 1 wherein the hydrophobic segments of the first associative thickener comprise a branched hydrophobic substituent.

8. The method of claim 5 wherein the hydrophobic segments of the first associative thickener comprise a branched hydrophobic substituent.

9. The composition of claim 7 wherein the branched hydrophobic substituent is based on a Guerbet alcohol.

10. The composition of claim 1 wherein the first and second associative thickeners each comprise a thickener selected from the group consisting of nonionic hydrophobically-modified ethylene oxide urethane copolymers, nonionic hydrophobically-modified ethylene oxide ether copolymers, and mixtures thereof.

11. The method of claim 5 wherein the first and second associative thickeners each comprise a thickener selected from the group consisting of nonionic hydrophobically-modified ethylene oxide urethane copolymers, nonionic hydrophobically-modified ethylene oxide ether copolymers, and mixtures thereof.

* * * * *